US011556087B2

(12) United States Patent
Shimura

(10) Patent No.: US 11,556,087 B2
(45) Date of Patent: Jan. 17, 2023

(54) POWER SUPPLY APPARATUS AND IMAGE FORMING APPARATUS CONTROLLING A SWITCHING FREQUENCY BASED ON A FEEDBACK VOLTAGE

(71) Applicant: CANON KABUSHIKI KAISHA, Tokyo (JP)

(72) Inventor: Yasuhiro Shimura, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 7 days.

(21) Appl. No.: 16/719,782

(22) Filed: Dec. 18, 2019

(65) Prior Publication Data
US 2020/0127551 A1  Apr. 23, 2020

Related U.S. Application Data

(63) Continuation of application No. 16/057,636, filed on Aug. 7, 2018, now Pat. No. 10,547,235.

(30) Foreign Application Priority Data

Aug. 15, 2017  (JP) .............................. JP2017-156870

(51) Int. Cl.
| | | |
|---|---|---|
| H02M 3/335 | (2006.01) | |
| G03G 15/00 | (2006.01) | |
| H02M 1/08 | (2006.01) | |
| H02M 1/36 | (2007.01) | |
| H02M 1/00 | (2006.01) | |

(Continued)

(52) U.S. Cl.
CPC .............. *G03G 15/80* (2013.01); *H02M 1/08* (2013.01); *H02M 1/36* (2013.01); *H02M 3/33523* (2013.01); *H02M 3/33571* (2021.05); *H02M 1/0032* (2021.05); *H02M 1/342* (2021.05); *H02M 3/01* (2021.05)

(58) Field of Classification Search
None
See application file for complete search history.

(56) References Cited

U.S. PATENT DOCUMENTS

| | | |
|---|---|---|
| 9,823,617 B2 | 11/2017 | Shimura |
| 9,882,496 B2 | 1/2018 | Nishijima |
| 9,897,964 B2 | 2/2018 | Shimura |

(Continued)

FOREIGN PATENT DOCUMENTS

| | | |
|---|---|---|
| JP | 2004-208037 A | 7/2004 |
| JP | 2010-246200 A | 10/2010 |

(Continued)

OTHER PUBLICATIONS

Japanese Search Report dated May 11, 2021 in carresponding Japanese Application No. 2017-156870 (English Translation Included).

*Primary Examiner* — Jeffrey A Gblende
(74) *Attorney, Agent, or Firm* — Venable LLP

(57) ABSTRACT

The power supply apparatus alternately repeats a control between a first control of varying a frequency of switching operation within a predetermined range and for a predetermined cycle according to a frequency determined based on a feedback voltage, and a second control of varying the frequency within a range narrower than the predetermined range or a third control of controlling the frequency to be a constant frequency.

16 Claims, 9 Drawing Sheets

(51) Int. Cl.
    *H02M 1/34*           (2007.01)
    *H02M 3/00*           (2006.01)

(56)               References Cited

U.S. PATENT DOCUMENTS

| | | |
|---|---|---|
| 9,966,865 B2 | 5/2018 | Shimura |
| 10,389,259 B2 | 8/2019 | Asano |
| 2009/0086513 A1* | 4/2009 | Lombardo ........ H02M 3/33523 363/21.12 |
| 2012/0161514 A1* | 6/2012 | Choi ................ H02M 3/33576 307/17 |
| 2015/0147080 A1* | 5/2015 | Uchiyama .............. G03G 15/80 399/88 |
| 2015/0236598 A1* | 8/2015 | Krueger ............ H02M 3/33507 363/21.17 |
| 2016/0344293 A1* | 11/2016 | Hari ................ H02M 3/33507 |
| 2017/0176918 A1 | 6/2017 | Shimura |
| 2018/0212508 A1 | 7/2018 | Kobayashi |
| 2018/0316269 A1 | 11/2018 | Shimura |
| 2019/0020268 A1 | 1/2019 | Saito |
| 2019/0058387 A1 | 2/2019 | Shimura |
| 2019/0058406 A1 | 2/2019 | Asano |
| 2019/0190391 A1* | 6/2019 | Takahashi ......... H02M 3/33507 |

FOREIGN PATENT DOCUMENTS

| | | |
|---|---|---|
| JP | 5645979 | 11/2014 |
| JP | 2017-17847 A | 1/2017 |
| JP | 2017-73867 A | 4/2017 |

* cited by examiner

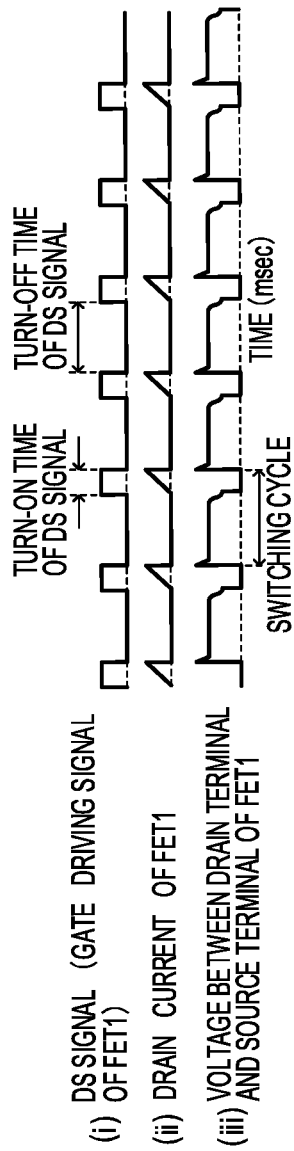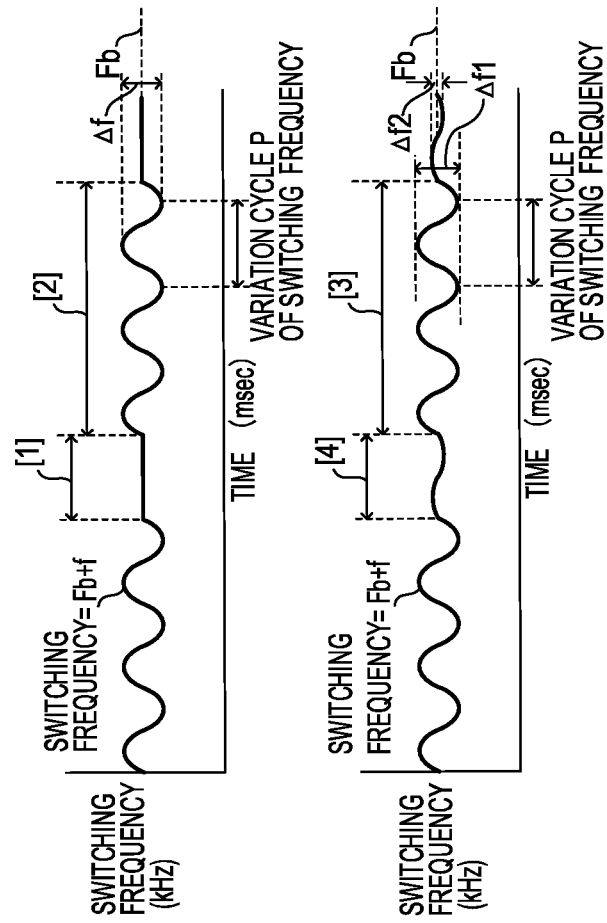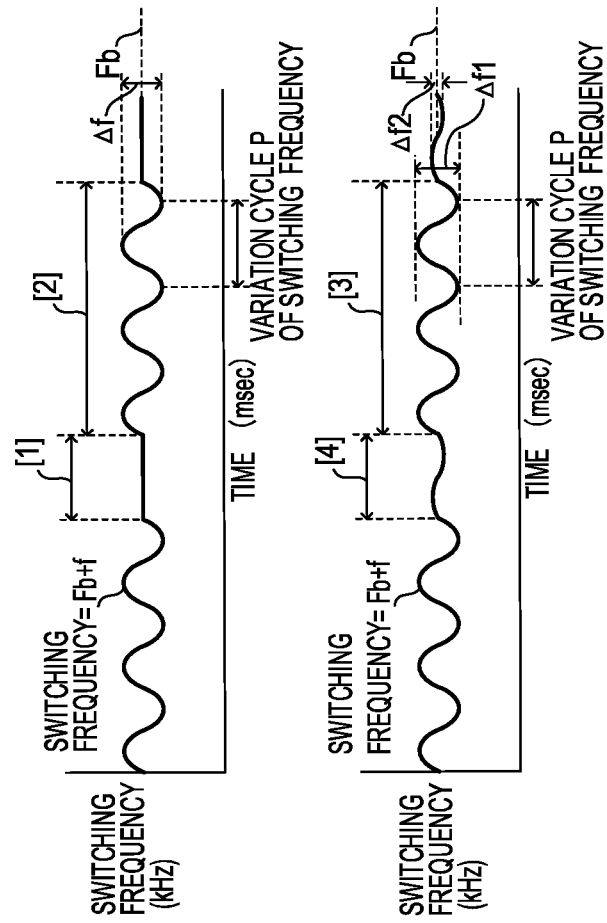

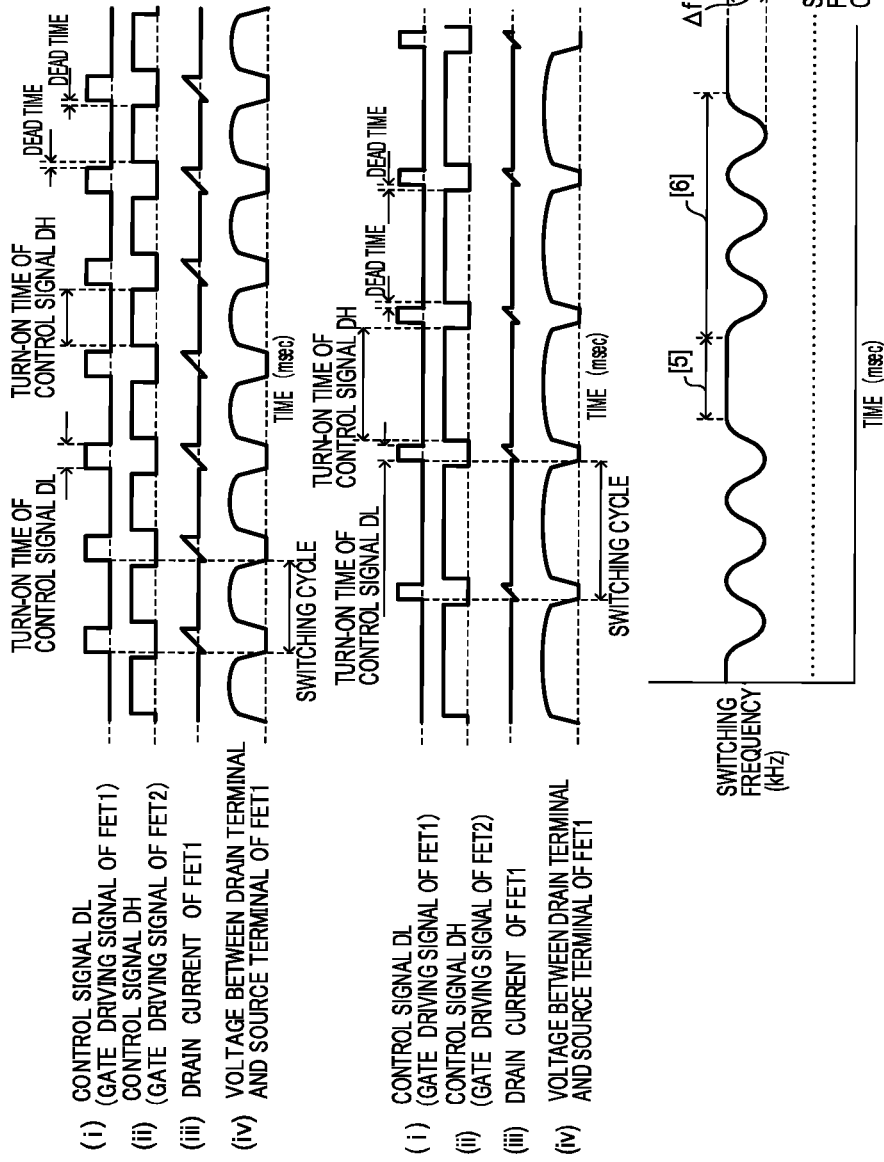

FIG.6A

NOISE IN TERMINAL VOLTAGE ACCORDING TO FLUCTUATION CONTROL

| CONTROL METHOD | NOISE IN TERMINAL VOLTAGE (AVERAGE) |
|---|---|
| (a) w/o FLUCTUATION CONTROL | 62.3 dB |
| (b) w/ FLUCTUATION CONTROL (w/o STOP PERIOD CONTROL) | 54.9 dB |
| (c) w/ FLUCTUATION CONTROL (w/ STOP PERIOD CONTROL) | 51.3 dB |

(b) w/ FLUCTUATION CONTROL (w/o STOP PERIOD CONTROL)

| FREQUENCY | NOISE IN TERMINAL VOLTAGE (AVERAGE) |
|---|---|
| 208 kHz | 54.9 dB |
| 218 kHz | 53.9 dB |
| 222 kHz | 52.9 dB |

(c) w/ FLUCTUATION CONTROL (w/ STOP PERIOD CONTROL)

| FREQUENCY | NOISE IN TERMINAL VOLTAGE (AVERAGE) |
|---|---|
| 208 kHz | 52.0 dB |
| 218 kHz | 52.2 dB |
| 222 kHz | 51.6 dB |

POWER SUPPLY APPARATUS AND IMAGE FORMING APPARATUS CONTROLLING A SWITCHING FREQUENCY BASED ON A FEEDBACK VOLTAGE

This application is a continuation of application Ser. No. 16/057,636 filed Aug. 7, 2018, currently pending; and claims priority under 35 U.S.C. § 119 to Japan 2017-156870, filed on Aug. 15, 2017; and the contents of all of which are incorporated herein by reference as if set forth in full.

BACKGROUND OF THE INVENTION

Field of the Invention

The present invention relates to a power supply apparatus and an image forming apparatus.

Description of the Related Art

A switched-mode power supply converts AC voltage of a power supply such as a commercial power supply to DC voltage. Methods, for example a method of Japanese Patent No. 05645979, have been proposed for reducing noise in terminal voltage, which is conductive interference for a power supply port of a switched-mode power supply. Japanese Patent No. 05645979 proposes a switching frequency fluctuation control method of a switched-mode power supply.

When switching frequency fluctuation control is performed, however, a transformer used in the switched-mode power supply produces sound due to periods of varying the switching frequency. Another problem is the increase of terminal noise caused by the switched-mode power supply.

SUMMARY OF THE INVENTION

An aspect of the present invention is a power supply apparatus including: a transformer having a primary winding and a secondary winding; a switching element connected in series to the primary winding of the transformer; a feedback unit configured to output a feedback voltage to a primary side according to a voltage induced in the secondary winding of the transformer; and a control unit configured to control switching operation of turning on or off the switching element based on the feedback voltage, wherein the control unit alternately repeats a first control of varying a frequency of the switching operation within a predetermined range, and a second control of controlling the frequency within a range narrower than the predetermined range.

Another aspect of the present invention is a power supply apparatus including: a transformer having a primary winding and a secondary winding; a first switching element connected in series to the primary winding of the transformer; a second switching element connected in parallel to the primary winding of the transformer; a capacitor connected in series to the second switching element and connected along with the second switching element in parallel to the primary winding of the transformer; a feedback unit configured to output a feedback voltage to a primary side according to a voltage induced in the secondary winding of the transformer; and a control unit configured to control turning on or off of the first switching element and the second switching element based on the feedback voltage, wherein the control unit is a power supply device configured to perform switching operation of alternately turning on or off the first switching element and the second switching element before and after a dead time during which the first switching element and the second switching element are both turned off; wherein the power supply apparatus is capable of switching a state between a first state in which an output voltage output from the secondary winding is a first voltage and a second state in which the output voltage is a second voltage lower than the first voltage can be performed, and in the first state, the control unit alternately repeats a control between a first control of varying a frequency of the switching operation within a predetermined range, and a second control of varying the frequency within a range narrower than the predetermined range or a third control of controlling the frequency to be a constant frequency.

A further aspect of the present invention is an image forming apparatus including: an image forming unit configured to form an image on a recording material; and a power supply apparatus configured to power the image forming apparatus, wherein the power supply apparatus includes: a transformer having a primary winding and a secondary winding; a switching element connected in series to the primary winding of the transformer; a feedback unit configured to output a feedback voltage to a primary side according to a voltage induced in the secondary winding of the transformer; and a control unit configured to control switching operation of turning on or off the switching element based on the feedback voltage, wherein the power supply apparatus is capable of switching a state between a first state in which an output voltage output from the secondary winding is a first voltage and a second state in which the output voltage is a second voltage lower than the first voltage. In the second state, the control unit alternately repeats a control between a first control of varying a frequency of the switching operation within a predetermined range, and a second control of varying the frequency within a range narrower than the predetermined range or a third control of controlling the frequency to be a constant frequency.

A still further aspect of the present invention is an image forming apparatus including: an image forming unit configured to form an image on a recording material; and a power supply apparatus configured to power the image forming apparatus, wherein the power supply apparatus includes: a transformer having a primary winding and a secondary winding; a switching element connected in series to the primary winding of the transformer; a feedback unit configured to output a feedback voltage to a primary side according to a voltage induced in the secondary winding of the transformer; and a control unit configured to control switching operation of turning on or off the switching element based on the feedback voltage, wherein the control unit alternately repeats a control between a first control of varying a frequency of the switching operation within a predetermined range, and a second control of varying the frequency within a range narrower than the predetermined range or a third control of controlling the frequency to be a constant frequency.

Further features of the present invention will become apparent from the following description of exemplary embodiments with reference to the attached drawings.

BRIEF DESCRIPTION OF THE DRAWINGS

FIGS. 2A, 2B and 2C are diagrams describing a control method for the power supply circuit in the first embodiment.

FIGS. 5A, 5B and 5C are diagrams describing a control method for the power supply circuit in the second embodiment.

FIGS. 6A and 6B are diagrams describing an improved effect of noise in terminal voltage and sound of an isolation transformer in the second embodiment.

DESCRIPTION OF THE EMBODIMENTS

Preferred embodiments of the present invention will now be described in detail in accordance with the accompanying drawings.

Figure 1:
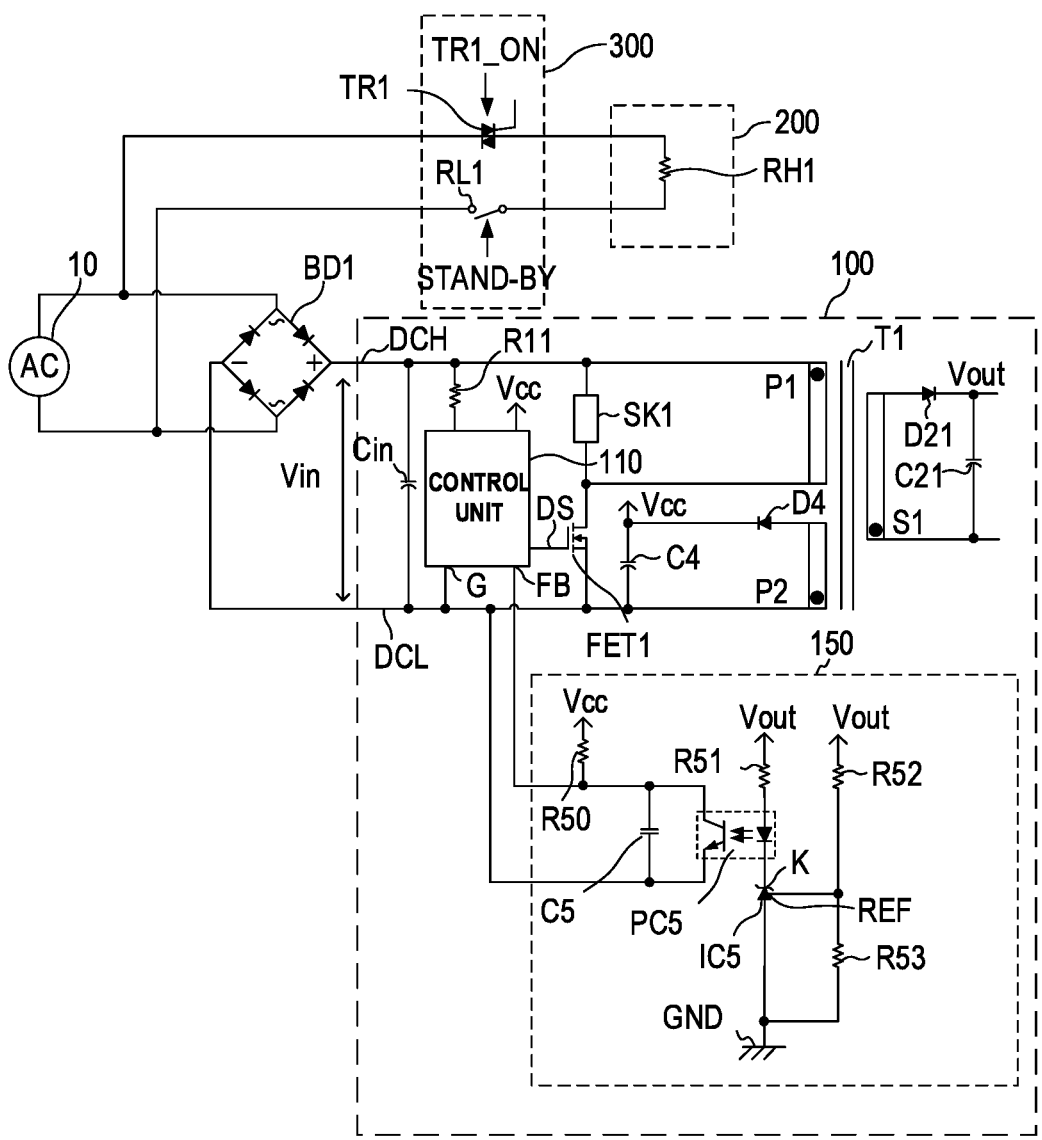
FIG. 1 is a schematic diagram of a power supply circuit in a first embodiment.

FIG. 1 illustrates a block diagram of a circuit of a switched-mode power supply 100, a rectifier circuit for an AC power supply 10, and a control circuit 300 in a first embodiment.

(Rectifier Circuit for AC Power Supply 10)

An AC power supply 10 such as a commercial power supply outputs AC voltage. A diode bridge BD1 is a full-wave rectification unit and rectifies an input voltage Vin, which is then input to a switched-mode power supply 100. A capacitor Cin is a smoothing device for rectified voltage, where DCL and DCH respectively denote the lower and higher potentials of the capacitor Cin.

(Control Circuit 300)

A control circuit 300 is a circuit for powering a heater resistor RH1 of a heater 200. A relay RL1 is controllable with a STAND-BY signal, which is an externally input signal, and a bidirectional thyristor (hereinafter referred to as a TRIAC) TR1 is controllable with a TR1_ON signal. For example, setting the STAND-BY signal high turns on the relay RL1, so that the heater resistor RH1 can be powered. Further, when the TR1_ON signal turns on the TRIAC TR1, the heater resistor RH1 is powered.

(Switched-Mode Power Supply 100)

The switched-mode power supply 100 is an isolated DC/DC converter that converts the input voltage Vin charged to the capacitor Cin and outputs an output voltage Vout (a constant voltage of 24V as an example in the first embodiment) to the isolated secondary side. The switched-mode power supply 100 has an isolation transformer T1, which includes a primary winding P1 and an auxiliary winding P2 on the primary side and a secondary winding S1 on the secondary side. Energy is supplied from the primary winding P1 to the secondary winding S1 of the transformer T1 by switching operation of a field effect transistor (hereinafter referred to as an FET)1 to be described in FIGS. 2A to 2C.

The primary side of the switched-mode power supply 100 has the FET1 that is a switching element connected in series to the primary winding P1 of the transformer T1, and a control unit 110 that is a control unit for the FET1. A DS signal is input from the control unit 110 to the gate terminal of the FET1. The secondary side of the switched-mode power supply 100 has a diode D21 and a capacitor C21, which are secondary-side rectifying and smoothing devices for flyback voltage generated in the secondary winding S1 of the transformer T1. The flyback voltage output from the auxiliary winding P2 is rectified and smoothed by a diode D4 and a capacitor C4 and supplied to the control unit 110 as a power supply voltage Vcc. A start-up resistor R11 is a resistor used to power the control unit 110 before the switching control of the FET1 is started. An SK1 is a surge absorption element.

A feedback unit 150 is used to control the output voltage Vout to be a predetermined constant voltage. The feedback unit 150 outputs feedback voltage to the primary side according to voltage induced in the secondary winding S1 of the transformer T1. The voltage value of the output voltage Vout is set based on the reference voltage of a reference terminal REF of a shunt regulator IC5, a resistor R52, and a resistor R53. When the voltage of the output voltage Vout becomes high, the current at a cathode terminal K of the shunt regulator IC5 increases, and current flowing to the secondary-side diode of a photocoupler PC5 via a pull-up resistor R51 increases. Then, current in the primary-side transistor of the photocoupler PC5 increases, so that a capacitor C5 is discharged and the voltage value of a signal input to an FB terminal of the control unit 110 decreases. When the voltage of the output voltage Vout becomes low, charging current flows from the power supply voltage Vcc to the capacitor C5 via a resistor R50, so that the value of the voltage (hereinafter referred to as an FB terminal voltage) of the signal input to the FB terminal increases. The control unit 110 of the switched-mode power supply 100 controls PWM output from an output terminal of the DS signal according to the result of detecting the FB terminal voltage, thereby performing feedback control for controlling the output voltage Vout to be the predetermined constant voltage.

(Operation of Switched-Mode Power Supply)

FIGS. 2A to 2C are diagrams describing the operation of the switched-mode power supply 100. FIG. 2A is a diagram describing the case of using PWM control to control the FET1. (i) illustrates voltage at the output terminal of the DS signal of the control unit 110 (a gate driving signal of the FET1) (hereinafter referred to as a DS signal), (ii) illustrates drain current of the FET1, and (iii) illustrates voltage between the drain terminal and the source terminal of the FET1.

When switching frequency fluctuation control to be described in FIG. 2B is not performed, PWM control sets the switching frequency (switching cycle) at a constant value Fb. The switching frequency fluctuation control, which is first control, is control of varying the switching frequency within a predetermined range (Δf to be described below) and for a predetermined cycle (P to be described below) with reference to the fixed switching frequency Fb of the control unit 110. In contrast, second control is control without the fluctuation control, in which the switching operation is performed with the switching frequency fixed at the switching frequency Fb. Hereinafter, the constant switching frequency Fb used in the case without fluctuation control will also be referred to as a calculated frequency Fb.

The control unit 110 controls the duty of the PWM output of the DS signal according to the result of detecting the FB terminal voltage. Here, the duty of the PWM output of the DS signal is expressed as "turn-on time of DS signal/ switching cycle of DS signal." When the DS signal turns on, the FET1 is turned on, and the drain current of the FET1 linearly increases as illustrated in FIG. 2A (ii). When the DS signal turns off, the FET1 is turned off, and flyback voltage is generated between the drain terminal and the source terminal of the FET1 as illustrated in FIG. 2A (iii). The flyback voltage is output from the secondary winding S2 of the transformer T1. The control method described in FIGS.

2A to 2C is an example of controlling the transformer T1. Other techniques such as pseudo-resonance control may be used instead of PWM control.

FIG. 2B is a diagram describing the switching frequency fluctuation control. In FIG. 2B, the horizontal axis indicates time (millisecond (msec)) and the vertical axis indicates switching frequency (kHz). First, in the period [1] illustrated in FIG. 2B in which the switching frequency fluctuation control is stopped, the switching frequency is controlled to be the constant frequency Fb. In the period [2] illustrated in FIG. 2B in which the switching frequency fluctuation control is performed, the switching frequency is controlled to be varied within a variation amount Δf and for a variation cycle P with reference to the switching frequency Fb. As illustrated in FIG. 2B, the control unit 110 controls to repeat the period [2] in which the switching frequency fluctuation control is performed and the period [1] in which the switching frequency fluctuation control is stopped. Where f is defined as the current fluctuation amount that varies within the variation amount Δf and for the variation cycle P, the switching frequency can be expressed as the following equation (1).

$$\text{switching frequency} = Fb + f \qquad \text{Equation (1)}$$

Now, performing the switching frequency fluctuation control causes a problem of sound produced by the transformer T due to the transformer T vibrating correspondingly to the variation cycle P. As illustrated in FIG. 2B, providing the period [1] in which the switching frequency fluctuation control is stopped can suppress the vibration sound of the transformer T1 caused by the variation cycle P of the switching frequency.

As illustrated in FIG. 2C, instead of providing the period in which the switching frequency fluctuation control is stopped, an extremely small variation amount Δf for the switching frequency fluctuation control may be used as the second control. FIG. 2C is a graph similar to FIG. 2B. In FIG. 2C, the switching frequency fluctuation control is performed for the entire period. In the period [3], the variation amount Δf for the switching frequency fluctuation control is a predetermined variation amount Δf1. In the period [4], the variation amount Δf is a variation amount (a narrower range) Δf2 smaller than the predetermined variation amount (the predetermined range) used in the period [3] (Δf2<<Δf1).

(Control of Switched-Mode Power Supply)

Figure 3:
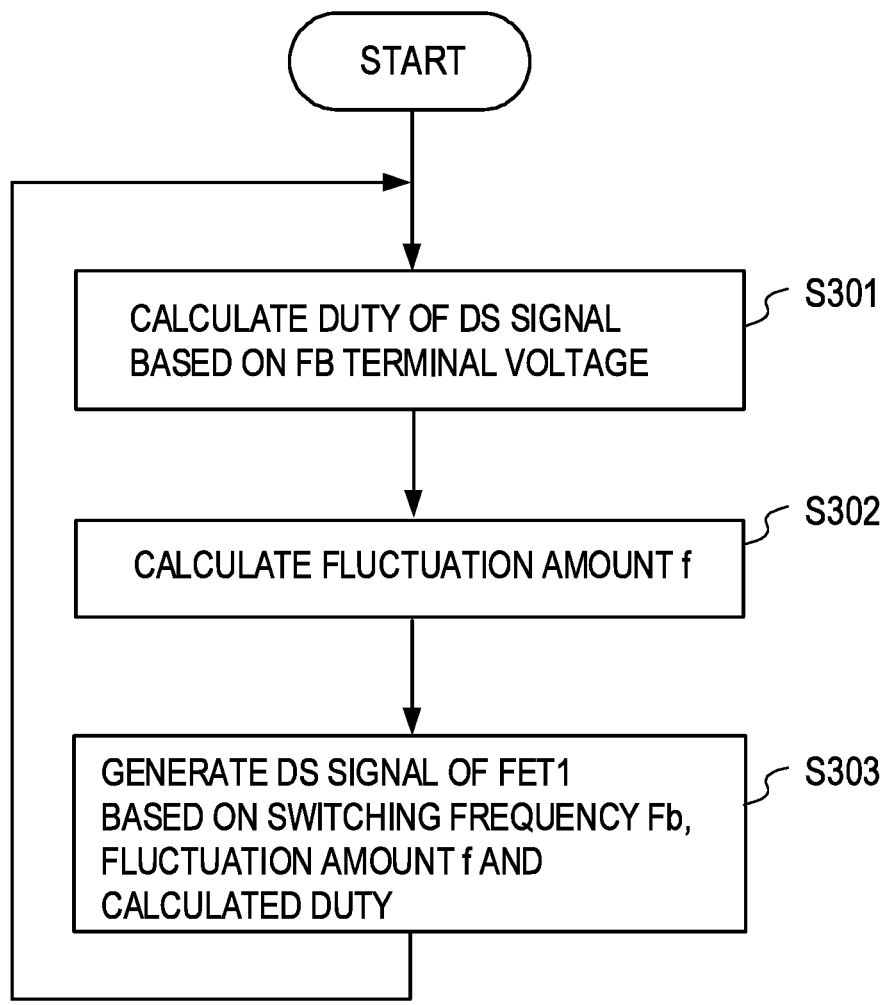
FIG. 3 is a flowchart illustrating control of the power supply circuit in the first embodiment.

FIG. 3 is a flowchart describing a sequence of controlling the switched-mode power supply 100 by the control unit 110 in the first embodiment. When the AC power supply 10 is connected to the switched-mode power supply 100 to power the switched-mode power supply 100, the control unit 110 starts control beginning at step (hereinafter denoted as S) 301.

At S301, the control unit 110 calculates the duty of PWM control of the DS signal of the FET1 based on the FB terminal voltage. The calculation will not be described because the duty of the FET1 is determined by calculation used for typical PWM control. At S302, the control unit 110 calculates the current fluctuation amount f varying within the variation amount Δf and for the variation cycle P as illustrated in FIG. 2B. The fluctuation amount f may be calculated using a timer (not shown) or processing unit (not shown) residing in the control unit 110. Too large variation amounts Δf cause ripple in the output voltage or increased sound of the transformer, while too small variation amounts Δf may lead to loss of the effect of terminal noise suppression. Therefore, an appropriate variation amount Δf capable of balancing these conditions may be determined. Too long variation frequencies P cause ripple in the output voltage, while too short variation frequencies P cause high-frequency operation sound to be produced by the transformer T. Therefore, an appropriate value for the variation cycle P capable of balancing these conditions may be determined (for example, 5 kHz in frequency). The variation amount Δf and the variation cycle P are stored in advance in memory (not shown) of the control unit 110.

The control unit 110 may control the switching frequency to sinusoidally vary, for example as illustrated in FIG. 2B. The control is actually stepwise and discrete rather than continuous, because the control unit 110 varies the frequency for each switching cycle. Further, although the variation of the switching frequency does not need to be sinusoidal as in FIG. 2B, the variation is preferably closer to a sinusoidal wave because milder variation leads to quieter operation sound of the transformer T. At S303, the control unit 110 generates the DS signal for controlling the FET1 based on the duty of PWM control calculated at S301 and the switching frequency Fb+f, and returns the process to S301. The control unit 110 outputs the generated DS signal to the gate terminal of the FET1 to control the switching operation of the FET1. By repeating the above control, the control unit 110 controls the switched-mode power supply 100.

The control is thus performed to repeat the period in which the switching frequency fluctuation control is performed and the period in which the switching frequency fluctuation control is stopped. Now, why this method is effective for achieving both the improvement of terminal noise of the switched-mode power supply 100 and the improvement of the sound level of the transformer T1 will be described. An alternative method for improving the sound level of the transformer T1 may be to reduce the variation amount Δf With this method, however, the sound level of the transformer T1 would be improved but the terminal noise would be less improved. With the method described in the first embodiment, i.e., controlling to repeat the period in which the switching frequency fluctuation control is performed and the period in which the switching frequency fluctuation control is stopped, the effect of the terminal noise improvement can be more increased as described in FIG. 6 in a second embodiment. Another method for improving the sound level of the transformer T1 may be to vary the switching frequency using multiple variation frequencies P. However, varying the switching frequency using multiple variation frequencies P would cause a problem of multiple-frequency sound produced by the transformer.

It is therefore effective that the control unit 110 of the switched-mode power supply 100 controls to repeat the period in which the switching frequency fluctuation control is performed and the period in which the switching frequency fluctuation control is stopped. This enables achieving both the reduction of noise in terminal voltage and the reduction of sound produced by the transformer, according to the first embodiment.

A switched-mode power supply 400 to be described in the second embodiment differs from the switched-mode power supply 100 described in the first embodiment in the following points. In the second embodiment, a CPU 13 is used for the control unit 410, and an active clamp circuit using an FET2 and a voltage resonance capacitor C2 is added. Further, in the second embodiment, the function of switching the control target voltage for the output voltage Vout is added to the feedback unit 151, a switching control unit 118 is provided, and the switching frequency fluctuation control is performed in a different way. Components similar to those in the first embodiment are labeled with the same symbols and will not be described.

(Switched-Mode Power Supply)

Figure 4:
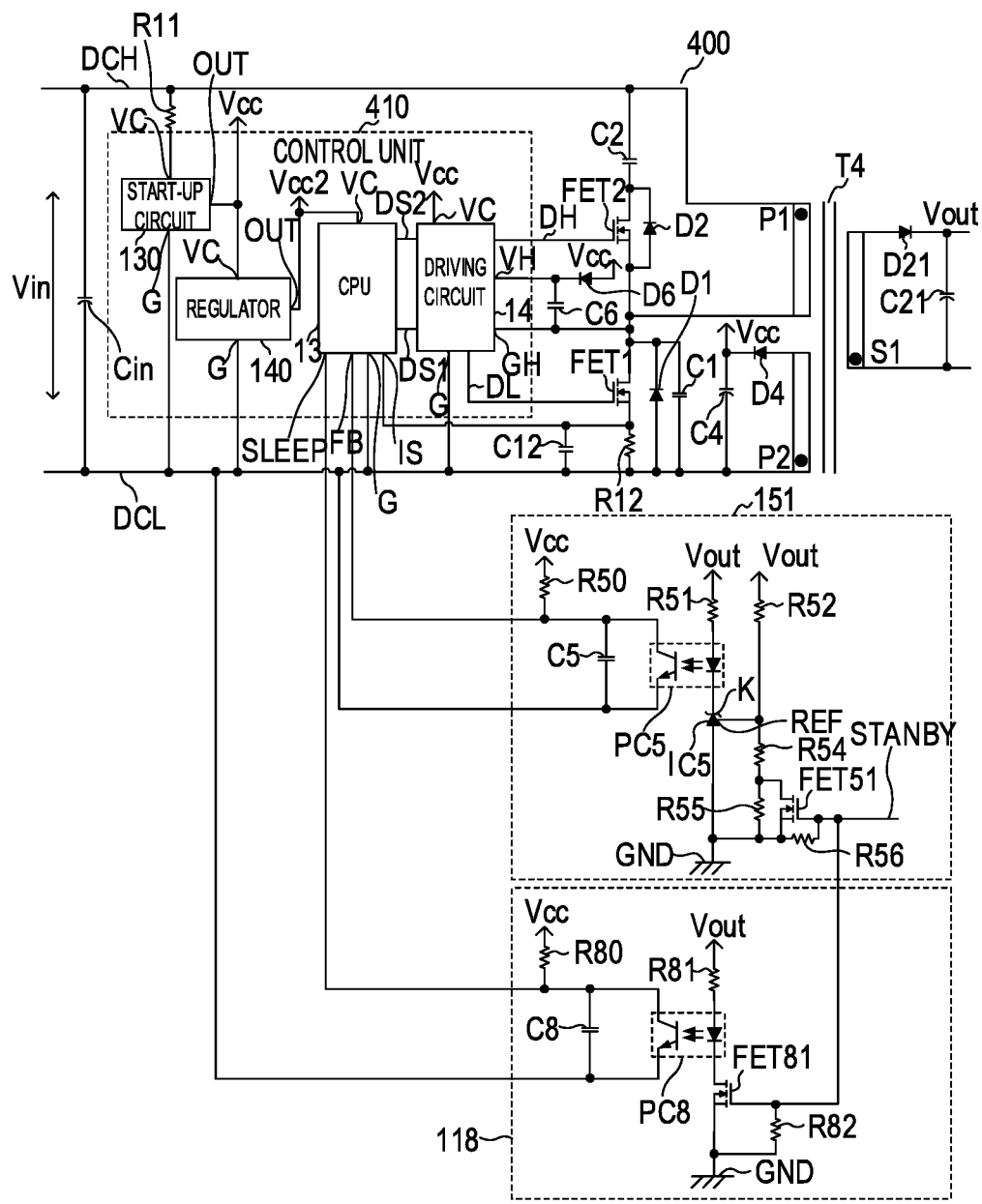
FIG. 4 is a schematic diagram of a power supply circuit in a second embodiment.

FIG. 4 is a circuit diagram for describing the details of a switched-mode power supply 400. The switched-mode power supply 400 has an isolation transformer T4, which includes a primary winding P1 and an auxiliary winding P2 on the primary side and a secondary winding S1 on the secondary side. Energy is supplied from the primary winding P1 to the secondary winding S1 of the transformer T4 by switching operation of an FET1 and an FET2 to be described in FIG. 5A. When the FET1 is turned on, forward voltage proportional to an input voltage Vin applied to the primary winding P1 is output to the auxiliary winding P2 of the transformer T4. The forward voltage is rectified and smoothed by a diode D4 and a capacitor C4, and a power supply voltage Vcc is supplied.

On the primary side of the switched-mode power supply 400, the FET1, which is a first switching element, is connected in series to the primary winding P1 of the transformer T4. A capacitor C2 for voltage clamping and the FET2, which is a second switching element, are connected in series to each other. The serially connected capacitor C2 for voltage clamping and FET2 are connected in parallel to the primary winding P1 of the transformer T4. As a control unit for the FET1 and the FET2, a control unit 410 is provided that mainly includes a CPU 13 and a driving circuit 14. A capacitor C1 for voltage resonance connected in parallel to the FET1 is provided for reducing loss at the time of switch-off of the FET1 and the FET2. A diode D1 is a body diode of the FET1. Similarly, a diode D2 is a body diode of the FET2.

A start-up circuit 130 is a 3-terminal regulator or a step-down switched-mode power supply, where an input voltage Vin is input between a VC terminal and a G terminal, and a power supply voltage Vcc is output from an OUT terminal. The start-up circuit 130 is a circuit that operates only if the power supply voltage Vcc supplied from the auxiliary winding P2 is not higher than a predetermined voltage value, and used to supply the power supply voltage Vcc upon start-up of the switched-mode power supply 400.

The regulator 140 is a 3-terminal regulator or a step-down switched-mode power supply, where the power supply voltage Vcc is input between a VC terminal and a G terminal of the regulator 140 and a power supply voltage Vcc2 is output from an OUT terminal. The regulator 140 outputs, as the power supply voltage Vcc2, a voltage value lower than the power supply voltage Vcc and suitable for the CPU 13 (Vcc2<Vcc1).

In the second embodiment, control by the control unit 410 uses the CPU 13 as a digital control unit. The power supply voltage Vcc2 generated by the regulator 140 is supplied between a VC terminal and a G terminal of the CPU 13. The CPU 13 outputs a control signal DS1 (a gate driving signal of the FET1) and a control signal DS2 (a gate driving signal of the FET2) based on a signal input from a feedback unit 151 to an FB terminal. The CPU 13 controls the FET1 and the FET2 via the driving circuit 14. The CPU 13 also detects the average of drain current of the FET1 using a current detection resistor R12 and a capacitor C12. The CPU 13 detects the average of the drain current of the FET1 input to an IS terminal to detect load that is output to an output voltage Vout. The voltage corresponding to the average of the drain current input to the IS terminal will be hereinafter referred to as an IS terminal voltage.

The driving circuit 14 is a circuit that generates a gate driving signal DL of the FET1 according to the control signal DS1, and a gate driving signal DH of the FET2 according to the control signal DS2. The power supply voltage Vcc is supplied between a VC terminal and a G terminal of the driving circuit 14. In order to drive the FET2, the power supply voltage Vcc is supplied between a VH terminal and a GH terminal by a charge pump circuit that includes a capacitor C6 and a diode D6. When the control signal DS1 goes high, the driving circuit 14 sets the gate driving signal DL of the FET1 high to turn on the FET1. Similarly, when the control signal DS2 goes high, the driving circuit 14 sets the gate driving signal DH of the FET2 high to turn on the FET2.

The feedback unit 151 can respond to a STAND-BY signal to switch between a second state in which a second voltage 5 V is output to the output voltage Vout and a first state in which a first voltage 24 V is output to the output voltage Vout. In the feedback unit 151, when the STAND-BY signal goes high, the FET 51 is turned on and a resistor R55 is shorted out. Therefore, in the feedback unit 151, a control voltage value of the output voltage Vout is determined by the resistance ratio between a resistor R52 and a resistor R54 and the voltage at an REF terminal of a shunt regulator IC5. The output voltage Vout at this time is the higher voltage value (24 V). In the feedback unit 151, when the STAND-BY signal goes low, the FET 51 is turned off. Therefore, in the feedback unit 151, the control voltage value of the output voltage Vout is determined by the resistance value of the resistor R52, the resistance ratio between the series resistances of the resistor R52 and a resistor R55, and the voltage at the REF terminal of the shunt regulator IC5. The output voltage Vout at this time is the lower voltage value (5 V). A resistor R56 is connected between the gate terminal and the source terminal of the FET 51.

A switching control unit 118, which is a switching unit, is used for the CPU 13 to control switching between stand-by state and sleep state based on the STAND-BY signal. When the STAND-BY signal goes high, the FET 81 is turned on, and current flows to a secondary-side diode of a photocoupler PC8 via a resistor R81. Thereafter, once a primary-side transistor of the photocoupler PC8 operates, a capacitor C8 is discharged, and the voltage at a SLEEP terminal of the CPU 13 goes low. When the STAND-BY signal goes low, the capacitor C8 is charged from the power supply voltage Vcc via a resistor R80, and the voltage at the SLEEP terminal of the CPU 13 goes high. The CPU 13 determines, based on the voltage at the SLEEP terminal, whether the switched-mode power supply 400 is in stand-by state (SLEEP terminal=low) or sleep state (SLEEP terminal=high). A resistor R82 is connected between the gate terminal and the source terminal of the FET 81.

(Control of Switched-Mode Power Supply)

FIGS. 5A to 5C are diagrams describing the method of controlling the switched-mode power supply 400. FIG. 5A is a diagram describing the method of controlling the FET1 and the FET2 in stand-by state. (i) illustrates the control signal DL (the gate driving signal of the FET1), (ii) illustrates the control signal DH (the gate driving signal of the FET2), (iii) illustrates drain current of the FET1, and (iv) illustrates voltage between the drain terminal and the source terminal of the FET1. Each horizontal axis indicates time (millisecond (msec)). The switching cycle may be, for example, from a rising edge to the next rising edge of the control signal DL.

Active clamp operation of the switched-mode power supply 400 will first be described. The CPU 13 repeatedly controls the FET1 and the FET2 to be alternately turned on and off with a predetermined dead time. When the control signal DL goes high, the FET1 is turned on, and the drain current of the FET1 linearly increases (FIG. 5A (iii)). When the control signal DL goes low, the FET1 is turned off: flyback voltage of the transformer T4 is absorbed by the active clamp circuit (the FET2 and the capacitor C2), and voltage resonance is caused by the transformer T4 and the capacitor C2. During this voltage resonance period, the control signal DH is kept high. Subsequently, setting the control signal DH low turns off the FET2, and the voltage between the drain terminal and the source terminal of the FET1 sharply decreases (FIG. 5A (iv)). Setting the control signal DL high upon the voltage between the drain terminal and the source terminal of the FET1 becoming below zero enables the FET1 to be zero-voltage switched. In this manner, with active clamp operation, the FET1 can be zero-voltage switched, and the energy charged to the leakage inductance of the transformer T1 can be regenerated for the capacitor Cin. The switched-mode power supply 400 can thus improve the power supply efficiency compared to the switched-mode power supply 100.

(Feedback Control)

The method of feedback control on the output voltage Vout will now be described. The CPU 13 controls the on-duty of the FET1 by controlling the turn-on time of the FET1 according to the FB terminal voltage, thereby controlling the output voltage Vout. The CPU 13 also detects an increase in the load on the switched-mode power supply 400 when the IS terminal voltage increases, and controls the turn-on time of the FET2 to be longer according to the IS terminal voltage. Therefore, as indicated in the following equation (2), the switching frequency Fc as a calculated frequency of the switched-mode power supply 400 varies depending on the state, such as the load, of the switched-mode power supply 400.

$$Fc=1/(\text{turn-on time of control signal DL}+\text{turn-on time of control signal DH}+\text{dead time}\times 2) \quad \text{Equation (2)}$$

FIG. 5B is a diagram describing the method of reducing the voltage value of the output voltage Vout in sleep mode of the switched-mode power supply 400. FIG. 5B (i) to (iv) illustrate waveforms similar to the waveforms in FIG. 5A (i) to (iv). The CPU 13, upon determining transition from stand-by mode to sleep mode based on the SLEEP signal, controls the turn-on time of the control signal DL to be shorter and the turn-on time of the control signal DH to be longer. The CPU 13 thus reduces the on-duty of the control signal DL to reduce the output voltage Vout.

The CPU 13 also has a feature of controlling the switching cycle in sleep mode to be longer than in stand-by mode in order to reduce noise in terminal voltage in sleep mode. Generally, more quietness is required in sleep mode than in stand-by mode. Therefore, in the switched-mode power supply 400, the switching frequency fluctuation control is not performed in sleep mode. Instead, the switching cycle is made longer to reduce the number of times of switching, so that terminal noise and other noise are reduced.

The switched-mode power supply 400 also has a feature of reducing the output voltage Vout to keep the drain current of the FET1 low in sleep mode (FIG. 5B (iii)), thereby enhancing the efficiency of the switched-mode power supply 400 in sleep mode. The output voltage Vout is proportional to the input voltage Vin, the winding ratio of the transformer T4, and the on-duty of the control signal DL. Where Pn1 denotes the number of turns of the primary winding of the transformer T4 and Pn2 denotes the number of turns of the secondary winding, the winding ratio of the transformer T4 is Pn2/Pn1. Therefore, reducing the output voltage Vout enables a shorter turn-on time of the control signal DL and a longer switching cycle.

(Switching Frequency Fluctuation Control)

FIG. 5C is a diagram describing the switching frequency fluctuation control and is a graph similar to FIG. 2B. The switching frequency fluctuation control, which is the first control, is control of varying the switching frequency within a predetermined range Δf and for a predetermined cycle P with reference to a switching frequency Fc determined by the control unit 110 based on the FB terminal voltage. In contrast, the second control is control without frequency control, in which the switching operation is performed with the switching frequency fixed at the switching frequency Fc determined by the control unit 110 based on the FB terminal voltage. As in the first embodiment, in stand-by mode in the second embodiment, the period in which the switching frequency fluctuation control is stopped [5] and the period in which the switching frequency fluctuation control is performed [6] are alternately provided. Fc2 denotes the switching frequency in sleep mode, which is indicated by a dotted line in the graph of FIG. 5C. As described above, in sleep mode, the frequency is constant (Fc2) because the switching frequency fluctuation control is not performed.

In the period [5] in which the switching frequency fluctuation control is stopped, as described in FIG. 5A, the switching frequency is controlled to be the switching frequency Fc calculated with the equation (2). FIG. 5C illustrates the case in which the result of calculating the switching frequency Fc is constant. The control method of the switched-mode power supply 400 differs from the control method described in FIG. 2B in that the switching frequency in the period [5] in which the switching frequency fluctuation control is stopped is controlled to be the highest frequency within the range of the variation amount Δf. As illustrated in FIG. 5C, by optimizing the length of the period [5] in which the switching frequency fluctuation control is stopped and the fixed frequency used in this period, terminal noise and other noise can be further reduced compared with the case in which the switching frequency fluctuation control is not stopped.

(Results of Measuring Noise in Terminal Voltage)

FIG. 6A (a) is results of measuring the noise in terminal voltage (average) where the following control schemes are used. (1) illustrates the result of measuring the noise in terminal voltage in the case without the fluctuation control, and the result is 62.3 dB. (2) illustrates the result of measuring the noise in terminal voltage in the case without the periods in which the switching frequency fluctuation control is stopped and with a variation cycle P of 6 kHz, and the result is 54.9 dB. (3) illustrates the result of measuring the noise in terminal voltage in the case where the variation cycle P of the switching frequency is 6 kHz and the switching frequency is controlled to be the highest frequency in the periods in which the switching frequency fluctuation control is stopped, and the result is 51.3 dB. As illustrated in FIG. 6A (a), it can be seen that the terminal noise can be further reduced by controlling to repeat the period in which the switching frequency fluctuation control is performed and the period in which the switching frequency fluctuation control is stopped.

FIG. 6A (b) illustrates the result of measuring the noise level (average) for various frequencies in the case without the periods in which the switching frequency fluctuation control is stopped. It can be seen that in the case of (b) without the periods in which the switching frequency fluctuation control is stopped, the noise level is relatively higher for a lower frequency (208 kHz) than for a higher frequency (222 kHz).

FIG. 6A (c) illustrates the result of measuring the noise level (average) for the various frequencies in the case where the frequency is controlled to be the highest frequency during the periods in which the switching frequency fluctuation control is stopped. In the case of (c) where the switching frequency is controlled to be the highest frequency during the periods in which the switching frequency fluctuation control is stopped, noise is produced uniformly for the frequencies from the lower frequency (208 kHz) to the higher frequency (222 kHz). Therefore, the control in (c) can more improve the margin of the noise in terminal voltage. The results in FIG. 6A exemplifies the ability to improve the noise in terminal voltage by setting a higher frequency during the periods in which the switching frequency fluctuation control is stopped than the average frequency used during the periods in which the switching frequency fluctuation control is performed.

Figure 6B:
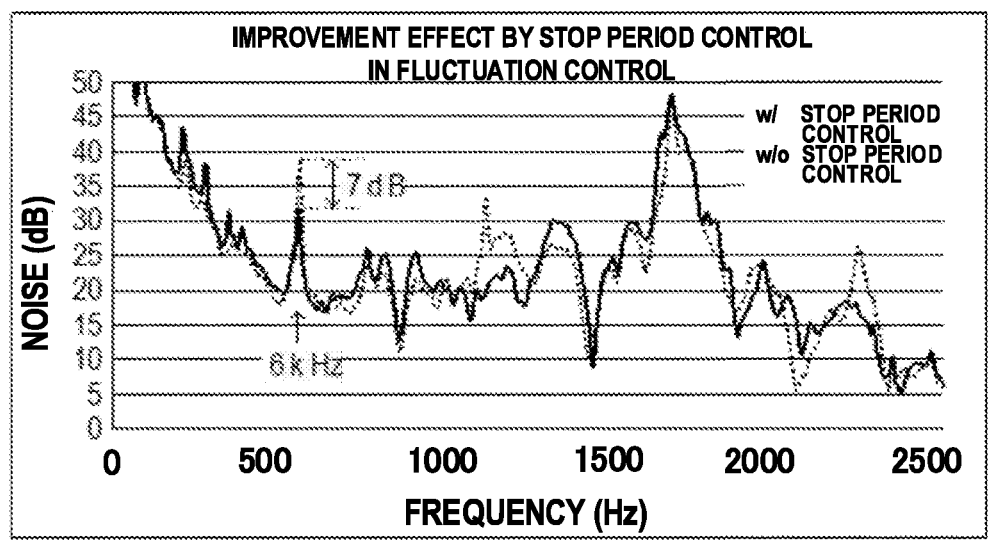

FIG. 6B is a graph illustrating an improved effect of transformer sound in the case with the periods in which the fluctuation control is stopped, showing spectra of sound measured near the transformer T4. In FIG. 6B, the horizontal axis indicates frequency (Hz) and the vertical axis indicates sound (dB). The solid line indicates the case with the periods in which the fluctuation control is stopped (with stop period control), and the dotted line indicates the case without the periods in which the fluctuation control is stopped (without stop period control). In the case with the stop period control indicated by the solid line in the graph, sound of the transformer T4 can be improved for the variation cycle P (=6 kHz) of the switching frequency by about 7 dB compared with the case without the stop period control indicated by the dotted line.

(Control of Switched-Mode Power Supply)

Figure 7:
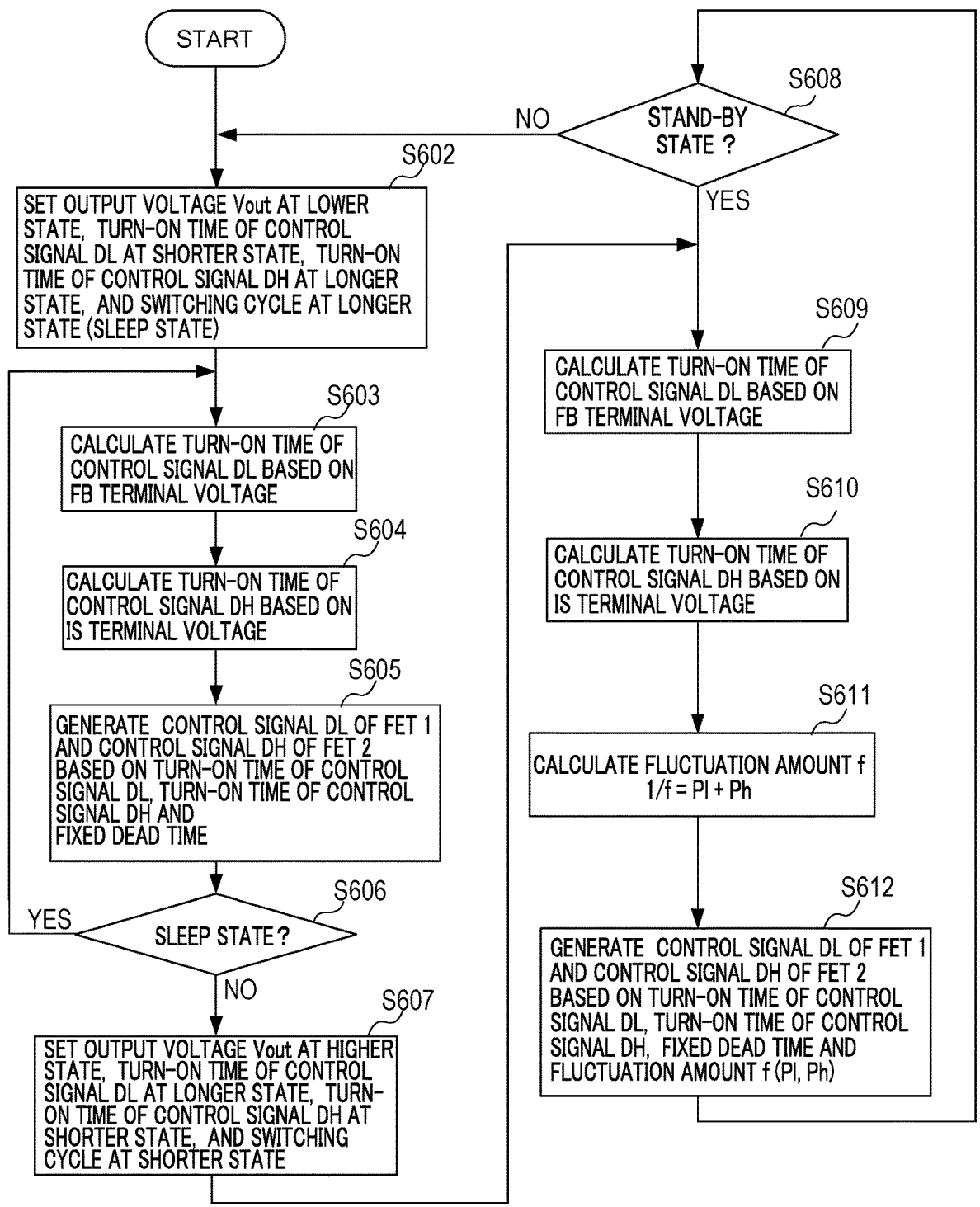
FIG. 7 is a flowchart illustrating control of the power supply circuit in the second embodiment.

FIG. 7 is a flowchart describing a sequence of controlling the switched-mode power supply 400 by the CPU 13 in the second embodiment. When the AC power supply 10 is connected to the switched-mode power supply 400 to power the switched-mode power supply 400, the CPU 13 starts a process beginning at S602. At S602, the CPU 13 shifts the switched-mode power supply 400 to sleep state. Control upon start-up is started in sleep state. Specifically, the CPU 13 sets the output voltage Vout at a lower state, sets the turn-on time of the control signal DL at a shorter state, sets the turn-on time of the control signal DH at a longer state, and sets the switching cycle at a longer state.

At S603, the CPU 13 calculates the turn-on time of the control signal DL based on the FB terminal voltage. At S604, the CPU 13 calculates the turn-on time of the control signal DH based on the IS terminal voltage. At S605, the CPU 13 generates the control signal DH and the control signal DL based on the turn-on time of the control signal DL, the turn-on time of the control signal DH, and a fixed dead time. At S606, the CPU 13 determines whether or not to shift the switched-mode power supply 400 from sleep state to stand-by state based on the SLEEP signal input from the switching control unit 118. If the CPU 13 detects that the SLEEP signal is low at S606, the CPU 13 determines shifting from sleep state to stand-by state and advances the process to S607 to perform control for transition to stand-by state. If the CPU 13 determines that the SLEEP signal is high at S606, the CPU 13 returns the process to S603 in order to maintain sleep state, and repeats the control from S603 to S605. In this manner, the switching frequency fluctuation control is not performed in sleep mode.

At S607, the CPU 13 performs control for shifting the switched-mode power supply 400 to stand-by state. Specifically, the CPU 13 sets the output voltage Vout at a higher state, sets the turn-on time of the control signal DL at a longer state, sets the turn-on time of the control signal DH at a shorter state, sets the switching cycle at a shorter state, and advances the process to S609. At S609, the CPU 13 calculates the turn-on time of the control signal DL based on the FB terminal voltage. At S610, the CPU 13 calculates the turn-on time of the control signal DH based on the IS terminal voltage. At S611, the CPU 13 calculates the current fluctuation amount f varying within the variation amount $\Delta f$ and for the variation cycle P, as illustrated in FIG. 5C. P1 denotes the variation amount of the turn-on time of the control signal DL, and Ph denotes the variation amount of the turn-on time of the control signal DH. The CPU 13 performs the switching cycle fluctuation control by varying the variation amount P1 of the turn-on time of the control signal DL and the variation amount Ph of the turn-on time of the control signal DH. The relationship among the variation amount P1 of the turn-on time of the control signal DL, the variation amount Ph of the turn-on time of the control signal DH, and the fluctuation amount f is determined from the following equation (3).

$$1/f = P1 + Ph \qquad \text{Equation (3)}$$

Since the fluctuation amount f is based on the variation amount P1 and the variation amount Ph, the fluctuation amount f may hereinafter be denoted as f (P1, Ph). The fluctuation amount f (P1, Ph) can be calculated by the CPU 13 using a timer (not shown) residing in the CPU 13.

At S612, the CPU 13 generates the control signal DH and the control signal DL based on the turn-on time of the control signal DL, the turn-on time of the control signal DH, the current fluctuation amount f (P1, Ph) and the fixed dead time, and advances the process to S608. At S608, the CPU 13 determines whether or not to shift the switched-mode power supply 400 from stand-by state to sleep state based on the SLEEP signal input from the switching control unit 118. If the CPU 13 detects that the SLEEP signal is high at S608, the CPU 13 returns the process to S602 for shifting from stand-by state to sleep state, and transitions to sleep state. If the CPU 13 detects that the SLEEP signal is low at S608, the CPU 13 advances the process to S609 in order to maintain stand-by state, and repeats the control from S609 to S612. By performing the above control, the CPU 13 controls the switched-mode power supply 400.

As has been described above, the control unit 410 of the switched-mode power supply 400 has periods in which the switching frequency fluctuation control is performed and periods in which the switching frequency fluctuation control is stopped. During the periods in which the switching frequency fluctuation control is stopped in stand-by mode in the second embodiment, the switching frequency is set at the highest frequency within the range of the variation amount $\Delta f$ of the switching frequency. Further, in sleep mode in the second embodiment, the switching frequency fluctuation control is not performed. Thus, according to the second embodiment, both the reduction of noise in terminal voltage and the reduction of sound produced by the transformer can be achieved.

The switched-mode power supplies 100 and 400 described in the first and second embodiments, which are power supply apparatuses, are applicable as a low-voltage power supply of an image forming apparatus (i.e., as a switched-mode power supply that powers a controller (control unit) and a driving unit such as a motor), for example. Described below is a configuration of an image forming apparatus to which the switched-mode power supply 400 in the second embodiment is applied.

[Configuration of Image Forming Apparatus]

Figure 8:
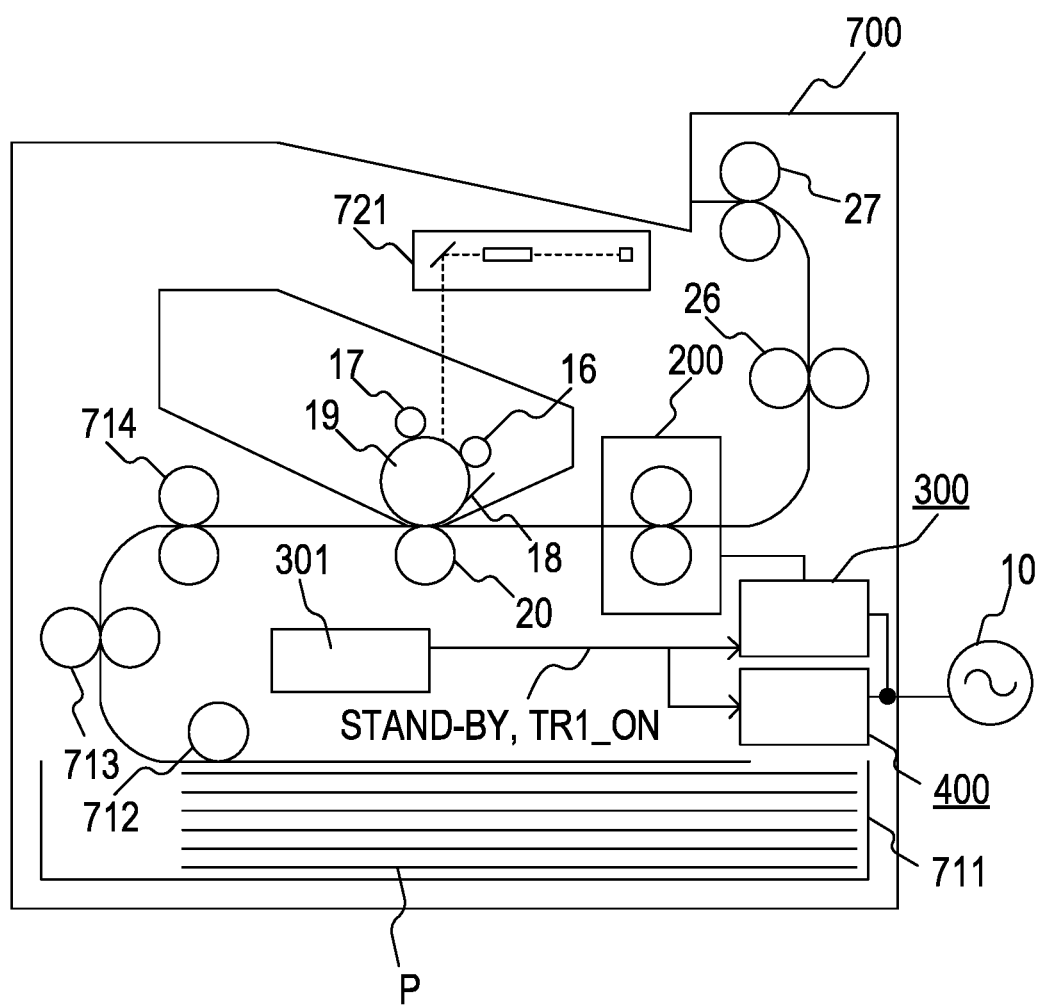
FIG. 8 is a schematic diagram of an image forming apparatus in a third embodiment.

As an exemplary image forming apparatus, a laser beam printer will be described. FIG. 8 is a cross-sectional view of a laser printer (image forming apparatus) 700 that uses electrophotography recording technique. When a print signal is generated, a scanner unit 721 emits laser light modulated according to image information and scans a photosensitive drum 19 electrically charged by a charge roller 16 with a predetermined polarity. An electrostatic latent image is thus formed on the photosensitive drum 19. Toner is applied to this electrostatic latent image from a developing unit 17 to form a toner image on the photosensitive drum 19 according to the image information. Meanwhile, sheets of recording material (recording paper) P put on a paper feed cassette 711 are fed by a pickup roller 712 one by one and conveyed by a roller 713 toward a registration roller 714.

Further, when the toner image on the photosensitive drum 19 arrives at a transfer position defined by the photosensitive drum 19 and a transfer roller 20, simultaneously the recording material P is conveyed from the registration roller 714 to the transfer position. As the recording material P passes through the transfer position, the toner image on the photosensitive drum 19 is transferred onto the recording material P. The recording material P is then heated by a heater 200, so that the toner image is fused with heat onto the recording material P. The recording material P with the fused toner image is ejected by rollers 26 and 27 onto a tray at the top of the laser printer 700. A cleaner 18 is for cleaning the photosensitive drum 19. The control circuit 300 for the heater, connected to the commercial AC power supply 10, powers the heater 200. The above described photosensitive drum 19, charge roller 16, scanner unit 721, developing unit 17 and transfer roller 20 constitute an image forming unit that forms, onto the recording material P, an image to be fused. The image forming apparatus to which the switched-mode power supply 400 is applicable is not limited to the apparatus exemplified in FIG. 8, but may be an image forming apparatus that includes multiple image forming units, for example. Further, the image forming apparatus may include a primary transfer unit for transferring a toner image on the photosensitive drum 19 onto an intermediate transfer belt and a secondary transfer unit for transferring the toner image on the intermediate transfer belt onto a sheet.

The laser printer 700 includes a controller 301 that controls image forming operation of the image forming unit and operation of conveying the recording material P. The controller 301 outputs the STAND-BY signal and the TR1_ON signal described in the first and second embodiments and controls the switched-mode power supply 400 and the control circuit 300. The switched-mode power supply 400 powers driving units such as motors for rotating the photosensitive drum 19 or for driving various rollers conveying the recording material P, and powers the controller 301.

Stand-by mode and sleep mode of the laser printer 700 will now be described. Stand-by mode of the laser printer 700 is defined as a state capable of image forming. In stand-by mode, the controller 301 controls the control circuit 300 for the heater 200, so that the heater resistor RH1 of the heater 200 can be powered. Sleep mode of the laser printer 700 is defined as a state incapable of image forming. In sleep mode, the relay RL1 of the control circuit 300 is off, so that the heater resistor RH1 of the heater 200 cannot be powered.

In the laser printer 700 in stand-by mode, noise in terminal voltage increases because noise is caused by the control circuit 300 in addition to noise of the switched-mode power supply 400. Therefore, in stand-by mode, the switching frequency fluctuation control described in FIG. 5C is performed to reduce the noise in terminal voltage of the laser printer 700.

In the laser printer 700 in sleep mode, the noise in terminal voltage of the laser printer 700 can be suppressed because no noise is caused by the control circuit 300. In the laser printer 700 in sleep mode, the switched-mode power supply 400 needs to be relatively quieter because driving parts such as fans (not shown) and motors (not shown) in the laser printer 700 stop. Therefore, in the laser printer 700 in sleep mode, the laser printer 700 is made quieter by not performing the switching frequency fluctuation control for the switched-mode power supply 400. Thus, according to the third embodiment, the reduction of noise in terminal voltage and the reduction of noise produced by the transformer can both be achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-156870, filed Aug. 15, 2017, which is hereby incorporated by reference herein in its entirety.

What is claimed is:

1. A power supply apparatus comprising:
   a transformer having a primary winding and a secondary winding;
   a switching part connected in series to the primary winding of the transformer;
   a feedback unit configured to output a feedback voltage to a primary side according to a voltage induced in the secondary winding of the transformer; and
   a control unit configured to perform switching operation of alternately turning on or off the switching part based on the feedback voltage,
   wherein the control unit is configured to alternately perform a first control for a first predetermined period and a second control for a second predetermined period,
   wherein the first control is to change a switching frequency of the switching part within a predetermined range and for a predetermined cycle with reference to a reference switching frequency, and the second control is to set the switching frequency at a predetermined frequency so that the predetermined frequency is not changed during the second predetermined period.

2. The power supply apparatus according to claim 1, wherein the control unit is configured to set the predetermined frequency to the reference switching frequency in the second control.

3. The power supply apparatus according to claim 1, wherein the switching part includes a first switching element connected in series to the primary winding of the transformer, a second switching element connected in parallel to the primary winding of the transformer, and a capacitor connected in series to the second switching element and connected along with the second switching element in parallel to the primary winding of the transformer,
   wherein the control unit is configured to perform switching operation of alternately turning on or off the first switching element and the second switching element before and after a dead time during which the first switching element and the second switching element are both turned off.

4. An image forming apparatus comprising:
an image forming unit configured to form an image on a recording material; and
a power supply apparatus configured to supply a power to the image forming apparatus,
wherein the power supply apparatus includes:
a transformer having a primary winding and a secondary winding;
a switching part connected in series to the primary winding of the transformer;
a feedback unit configured to output a feedback voltage to a primary side according to a voltage induced in the secondary winding of the transformer; and
a control unit configured to perform switching operation of alternately turning on or off the switching part based on the feedback voltage,
wherein the control unit is configured to alternately perform a first control for a first predetermined period and a second control for a second predetermined period,
wherein the first control is to change a switching frequency of the switching part within a predetermined range and for a predetermined cycle with reference to a reference switching frequency, and the second control is to set the switching frequency at a predetermined frequency so that the predetermined frequency is not changed during the second predetermined period.

5. The image forming apparatus according to claim 4, wherein the control unit is configured to set the predetermined frequency to the reference switching frequency in the second control.

6. The image forming apparatus according to claim 4, wherein the switching part includes a first switching element connected in series to the primary winding of the transformer, a second switching element connected in parallel to the primary winding of the transformer, and a capacitor connected in series to the second switching element and connected along with the second switching element in parallel to the primary winding of the transformer,
wherein the control unit is configured to perform switching operation of alternately turning on or off the first switching element and the second switching element before and after a dead time during which the first switching element and the second switching element are both turned off.

7. A power supply apparatus comprising:
a transformer having a primary winding and a secondary winding;
a switching part connected in series to the primary winding of the transformer;
a feedback unit configured to output a feedback voltage to a primary side according to a voltage induced in the secondary winding of the transformer; and
a control unit configured to perform switching operation of alternately turning on or off the switching part based on the feedback voltage,
wherein the control unit is configured to alternately perform a first control for a first predetermined period and a second control for a second predetermined period,
wherein the first control is to change a switching frequency of the switching part within a first predetermined range and for a predetermined cycle with reference to a reference switching frequency, and the second control is to change the switching frequency within a second predetermined range less than the first predetermined range and for a predetermined cycle with reference to the reference switching frequency.

8. The power supply according to claim 7, wherein the switching part includes a first switching element connected in series to the primary winding of the transformer, a second switching element connected in parallel to the primary winding of the transformer, and a capacitor connected in series to the second switching element and connected along with the second switching element in parallel to the primary winding of the transformer,
wherein the control unit is configured to perform switching operation of alternately turning on or off the first switching element and the second switching element before and after a dead time during which the first switching element and the second switching element are both turned off.

9. An image forming apparatus comprising:
an image forming unit configured to form an image on a recording material; and
a power supply apparatus configured to supply a power to the image forming apparatus,
wherein the power supply apparatus includes:
a transformer having a primary winding and a secondary winding;
a switching part connected in series to the primary winding of the transformer;
a feedback unit configured to output a feedback voltage to a primary side according to a voltage induced in the secondary winding of the transformer;
a control unit configured to perform switching operation of alternately turning on or off the switching part based on the feedback voltage,
wherein the control unit is configured to alternately perform a first control for a first predetermined period and a second control for a second predetermined period,
wherein the first control is to change a switching frequency of the switching part within a first predetermined range and for a predetermined cycle with reference to a reference switching frequency, and the second control is to change the switching frequency within a second predetermined range less than the first predetermined range and for a predetermined cycle with reference to the reference switching frequency.

10. The image forming apparatus according to claim 9, wherein the switching part includes a first switching element connected in series to the primary winding of the transformer, a second switching element connected in parallel to the primary winding of the transformer, and a capacitor connected in series to the second switching element and connected along with the second switching element in parallel to the primary winding of the transformer,
wherein the control unit is configured to perform switching operation of alternately turning on or off the first switching element and the second switching element before and after a dead time during which the first switching element and the second switching element are both turned off.

11. The power supply apparatus according to claim 1, wherein the predetermined frequency is included within the predetermined range with reference to the reference switching frequency.

12. The power supply apparatus according to claim 1, wherein the control unit is configured to determine the reference switching frequency based on the feedback voltage.

13. The image forming apparatus according to claim 4, wherein the predetermined frequency is included within the predetermined range with reference to the reference switching frequency.

14. The image forming apparatus according to claim 4, wherein the control unit is configured to determine the reference switching frequency based on the feedback voltage.

15. The power supply apparatus according to claim 7, wherein the control unit is configured to determine the reference switching frequency based on the feedback voltage.

16. The image forming apparatus according to claim 9, wherein the control unit is configured to determine the reference switching frequency based on the feedback voltage.

* * * * *